United States Patent [19]

Harley et al.

[11] Patent Number: 4,800,272

[45] Date of Patent: Jan. 24, 1989

[54] ENVIRONMENTAL GAMMA-RAY AND RADON DETECTOR

[75] Inventors: Naomi H. Harley, Hoboken, N.J.; Mark L. Maiello, Yonkers, N.Y.

[73] Assignee: New York University, New York, N.Y.

[21] Appl. No.: 21,450

[22] Filed: Mar. 4, 1987

[51] Int. Cl.4 ................................................ G01T 1/11
[52] U.S. Cl. .................................. 250/253; 250/255; 250/337
[58] Field of Search ................ 250/337, 253, 376, 255

[56] References Cited

U.S. PATENT DOCUMENTS

| 3,792,277 | 2/1974 | Yamashita et al. | 250/337 |
|---|---|---|---|
| 4,186,303 | 1/1980 | Smith et al. | 250/253 |
| 4,385,236 | 5/1983 | Hassib et al. | 250/473.1 |

FOREIGN PATENT DOCUMENTS 0237721  7/1986  Fed. Rep. of Germany ...... 250/253

OTHER PUBLICATIONS

Frank et al., "A Diffusion Chamber Radon Dosimeter for use in Mine Environment", *Nuclear Instruments and Methods*, vol. 109, No. 3, Jun. 1973, pp. 537–539.

Bigu et al., "Passive Radon/Thoron Personal Dosimeter using an Electrostatic Collector and Diffused-Junction Detector", *Review of Scientific Instruments* vol. 56, No. 1, Jan. 1985, pp. 146–153.

Breslin et al., "An Improved Time-Integrating Radon Monitor" NEA Specialist Meeting on Personal Dosimetry and Area Monitoring Suitable for Radon and Daughter Products, Paris, France Nov. 20–22, 1978.

Guggenheim et al., "A Time-Integrating Environmental Radon Daughter Monitor", *Health Physics* vol. 36, Mar. 1979, pp. 452–455.

Kotrappa et al., "Passive Measurement of Radon and Thoron using TLD or SSNTD on Electrets", *Health Physics*, vol. 43, No. 3, Sep. 1982, pp. 399–404.

Khan et al., "Electrets for Passive Radon Daughter Dosimetry", *Health Physics* vol. 46, No. 1, 1984, pp. 141–149.

Maiello, et al., "EGARD: An Environmental Gamma-Ray and Radon 222 Detector", *Health Physics* vol. 53, No. 3, Sep. 1987, pp. 301–305.

*Primary Examiner*—Janice A. Howell
*Assistant Examiner*—William F. Rauchholz
*Attorney, Agent, or Firm*—Darby & Darby

[57] ABSTRACT

A passive device for measuring environmental radioactivity employs three radiation detectors enclosed in a small shielded housing. A first radiation detector generates a first signal responsive to an amount of radioactivity produced over a period of time by radioactive gas diffused in the volume of air inside the housing. The first radiation detector includes at least one thermoluminescence dosimeter mounted in close proximity to an electret. A second radiation detector generates a second signal responsive to an amount of environmental gamma radiation over the period of time, and also includes at least one thermoluminescence dosimeter. A third radiation detector generates a third signal indicative of an amount of fading of the second signal over the period of time, the third radiation detector also including at least one thermoluminescene dosimeter having an initially predetermined third signal.

15 Claims, 2 Drawing Sheets

ENVIRONMENTAL GAMMA-RAY AND RADON DETECTOR

BACKGROUND OF THE INVENTION a. Field Of The Invention

The invention relates to a device for detecting environmental gamma radiation and radon gas concentrations. In particular, the invention is directed to a simple, low cost device for measuring the concentration of radon gas in homes and measuring the external radiation exposure from gamma-ray sources such as surrounding soil and building materials.

b. Description Of The Prior Art

Radon gas ($^{222}$Rn) is a decay product of the element radium ($^{226}$Ra) which is found in soils and rocks throughout the United States and the world. Radon can diffuse through cracks in rocks and through soil pores and enter the breathable atmosphere. Structures such as homes and other buildings can "trap" the $^{222}$Rn inside them because of typical low air ventilation rates. Concentrations of radon gas can possibly rise to high levels. High levels and their effects are known from the medical histories of hundreds of uranium miners who in many cases were exposed to high levels of the gas during the course of their work experience.

Although average household levels are probably orders of magnitude less than mine levels, the risk at these lower concentrations for developing lung cancer may not necessarily be insubstantial, due to the long time that people spend indoors and sometimes spend living in the same home.

With the threat of lung cancer definitively linked to exposure to $^{222}$Rn, it becomes necessary to determine where levels of the radon gas are acceptable and where they represent a significant health risk. This can only be done through actual measurement. Many devices for use in mines have been developed but such arrangements are unsuited for measuring the indoor household atmosphere. In general, known radon gas detectors are large, unreliable and noisy because they employ air pumps which consume electric power and are prone to mechanical breakdown without frequent service or maintenance. Other measuring devices measure the radon gas concentration at a given moment but do not consider known diurnal variations in radon gas levels, and these fluctuations may often be significant Such "instantaneous" monitors must be run repetitively so that accurate averages may be derived, necessarily introducing many possible sources for erroneous measurement. Accurate average annual exposure to radon is essential for lung cancer risk estimation. Other devices measure levels of the radioactive decay products of the $^{222}$Rn itself, but these generally require expensive electronics and again provide only instantaneous measurement.

In particular, known devices for obtaining instantaneous radon gas samples include the Lucas flask, the two-filter method, and pulse ionization chambers. The Lucas flask is a small glass, metal or plastic chamber having a flat transparent bottom. The flask walls are opaque, and on the inside are coated with zinc-sulfide (ZnS(Ag)) phosphor. Air is permitted to enter the flask, and after a short period of exposure, alpha particles emitted by $^{222}$Rn, RaA and RaC' impinge on the zinc-sulfide phosphor thus causing the phosphor to scintillate. These scintillations are then counted using a photomultiplier tube (PMT) and sophisticated electronics to provide a measure of the radon gas concentration within the flask. While providing sensitivity as low as 0.1 pCi/liter, the Lucas flask is fragile, not easily transportable, and difficult for an untrained person to use.

The two-filter method involves drawing a large sample of air through a tube by using a high volume pump. The first filter removes radon daughters at the tube inlet, and the second filter collects a fraction of the radon daughters created within the tube at the tube outlet. Alpha activity of the outlet filter can then be related to the $^{222}$Rn concentration in the sampled air. This device requires a portable high volume air pump, and a portable alpha particle counter. Also, the sensitivity of the device depends primarily on the tube dimensions, flow rate and length of sampling time.

Pulse ionization chambers are sophisticated, accurate measuring systems requiring a good deal of support equipment. Thus, although extremely accurate and sensitive, they are not in any way suitable to measurements in the field.

For the continuous measurement of radon concentration present in the air, the continuous Lucas flask, continuous two-filter method, and diffusion/electrostatic radon monitors (types I and II) are known. The type I diffusion/ electrostatic monitor is a relatively small device for indoor environmental measurements. Radon passively diffuses into a hemispherically shaped enclosure formed of wire mesh supporting a foam filter material, which prevents entry of radon daughters into the enclosure. A negative electrode at the bottom of the enclosure is coated with zinc-sulfide (Zn-S(Ag)) phosphor. Positively charged radon daughters are collected on the eletrode where they decay. The alpha particles impinge on the phosphor, producing scintillations which may be detected by a photomultiplier tube (PMT) and then counted over a preset time interval with any conventional electronic equipment. While the type I device eliminates the need for the noisy and unreliable air pump, the device is subject to a known "memory" effect (due to the decay product RaC' produced by RaA, RaB and RaC in one count interval, which "adds" to the alpha count in the subsequent count period). This makes the measurements inaccurate over periods of time during which radon concentration varies.

A known type II diffusion/electrostatic radon monitor uses passive diffusion (filtered) to provide a sampling volume into which only radon, but not radon daughters, may enter. Inside the volume is a highly negatively charged electret surface which draws newly formed radon daughters away from the volume walls, the walls once again being coated with zinc-sulfide phosphor. Resulting scintillations are detected by a photomultiplier tube (PMT) and are counted. While an improvement over the type I diffusion/electrostatic monitor, this device still requires delicate counting electronics and the PMT, both of which require power supplies. For a one hour counting period, this device may have sensitivity as low as 0.03 pCi/liter of $^{222}$Rn.

Another general class of known monitoring device is the "integrating" monitor, in which a signal from the varying concentration of radon gas or its products is accumulated and then averaged over the exposure period to obtain a mean concentration. Known devices and techniques for integrating radon monitors include the technique, the "MYLAR bag technique," the diffusion-/electrostatic integrating radon monitor, the diffusion- /electrostatic integrating radon monitor using X-ray film, the activated carbon radon monitor, and the solid state nuclear track detector (SSNTD).

The "MYLAR bag technique" involves filling a bag through a precision needle valve with a battery-operated pump, over a period of about 48 hours. The MYLAR bag is returned to the laboratory for analysis of its contents. This method is not suitable for long term use, and the pump/needle valve arrangement is prone to frequent breakdowns.

A diffusion/electrostatic integrating radon monitor known as the Passive Environmental Radon Monitor (PERM) is described by Breslin, A. J., George, A. C., "An Improved Time-Integrating Radon Monitor," NEA Specialist Meeting On Personal Dosimetry and Area Monitoring Suitable for Radon and Daughter Products, Paris, Nov. 20-22, 1978. This device is similar to the continuous type I and II monitors described above, but the PMT is replaced by a signal integrating thermoluminescent dosimeter (TLD). Radon diffuses through a bed of silica gel positioned above the wide end of a metal funnel. The funnel end is covered covered by a wire mesh and filter paper to prevent entry of ambient radon daughters. The TLD. is placed at the bottom (narrow end) of the metal funnel, atop a brass electrode held at a high negative voltage by a battery. The metal funnel is electrically connected to the positive battery terminal. Positively charged radon daughters are attracted to the TLD where they deposit their energy of decay. Another TLD is provided to measure background gamma-radiation signal, which must be subtracted from the signal obtained from the radon-detecting TLD. The silica gel must be replaced frequently in conditions of high relative humidity, or the calibration is in error.

The X-ray film monitor is similar to the continuous type I diffusion/electrostatic monitor, except that the PMT and counter are replaced by X-ray film, which "records" each scintillation for later analysis.

The activated carbon monitor uses a sealed canister filled with activated carbon. When the canister is opened, radon gas is adsorbed; the canister is then re-sealed after a relatively brief period of time, for example, three days. The gamma-ray emissions from radon daughters trapped on the activated carbon may then be counted. This device is sensitive to humidity changes, and also has the drawback of variable accuracy, since it is possible for radon to desorb from the carbon during the sampling period.

Finally, the SSNTD involves counting radiation damage tracks left by alpha particles emitted by daughters RaA and RaC'. The alpha particles penetrate dielectric (detector) materials, such as cellulose nitrate, cellulose acetate, or a carbonic acid diester, leaving tracks which can be made optically visible by chemical etching, for subsequent counting. While advantageously passive in operation, inexpensive and small in size, the SSNTD is not generally highly accurate due to inherent difficulties in track counting. At low environmental levels, track counting is especially difficult due to presence of flaws in the detector material which appear as tracks, variations caused by the handling and storage history of the particular detector, and variability in the etching process for enhancing track visibility.

The use of electrostatically charged dielectric materials, such as polymers including polyurethane, polyethylene and fluorocarbons, to concentrate and collect positively charged radon daughters is also known. In particular, a TLD has been placed on top of a TEFLON electret in order to measure radon concentration, as described by Kotroppa, P., Dua, S. K., Pimpale, N. S., Gupta, P. C. et al., "Passive Measurement of Radon and Thoron Using TLD or SSNTD On Electrets," *Health Phys.* 43:399-404 (1982).

Others have investigated the use of electrets for passive radon daughter dosimetry. Phillips, C. R., Khan, A., Leung, H., *Development of Diffusion-Based Radon Daughter Dosimeters*, Research Report, Atomic Energy Control Board of Canada, INFO-0112 (1983); Khan, A., Phillips, C. R., "Electrets for Passive Radon Daughter Dosimetry," *Health Phys.* 46:141-49 (1984).

Despite the substantial work of others skilled in this crowded art and the long-felt need for a compact, silent, low-cost and portable radon detector, none of the aforementioned devices have proven satisfactory for the various reasons mentioned. Thus, it has not yet been feasible to undertake large-scale radon measurement programs in private residences and commercial buildings that would be required to map geographic regions requiring reduction of radon and radon daughter concentrations.

SUMMARY OF THE INVENTION

According to the invention, a device for measuring environmental radioactivity due to radon comprises a housing having walls for enclosing a volume of air inside the housing, with at least one wall having at least one opening therethrough for permitting radioactive gas to continuously diffuse into the volume of air. A first radiation detection means, preferrably a lithium fluoride TLD, is mounted within the housing, for providing a first signal responsive to an amount of radioactivity produced over a period of time by the radioactive radon gas diffused in the volume of air. The TLD.. is preferrably mounted in close proximity to a negatively charged electret, for attracting and concentrating the positively charged radon decay products whose alpha and beta emissions are then detected. The device does not have any means for actively moving the radon gas into the housing.

A broad object of the invention is to provide a practical device for measuring radon gas levels in a large number of buildings such as private homes. More specifically, it is an object of this invention to provide a compact, reliable radon detector which can be distributed to, used and then returned by the average homeowner, so as to easily provide the large number of measurements required for determining geographic areas where reduction of radon and radon daughter exposure levels is necessary.

Another object of the invention is to provide a low-cost radon detector which is virtually maintenance free in operation.

A further object is to provide a compact, light-weight device for measuring the mean concentration of radon gas over extended periods of time of one hundred days or more, which is silent in operation and which does not inconvenience the user in any substantial manner.

Still another object of the invention is to provide a compact radon measuring device which is easily transportable by ordinary mail, parcel post, or the like, without sustaining any damage.

Another object is to provide long term radon measurements which are preferable to short term measurements. Lung cancer risk is directly proportional to accumulated exposure and only accurate, long term measurements can provide this information.

Yet another object is to provide an inexpensive radon measuring device which is reusable.

Generally according to a preferred embodiment of the invention, a small metal housing is provided. A number of openings or access ports are defined on the sides of the housing to permit radon gas ($^{222}$Rn) to diffuse into the housing. The access ports are preferably covered or partially obstructed by a layer of porous material such as foam rubber sheet.

On each of at least two inner walls of the housing, a small metallic disk or platform is mounted for supporting means for detecting radiation, the radiation detecting means being of extremely small size and weight. In a preferred embodiment, the radiation detection means comprise commercially available thermoluminescent detectors (TLDs), having dimensions approximately 0.32 cm×0.32 cm×0.04 cm. The TLD may, however, be larger. Each platform is provided with two or three TLDs.

One such platform is preferably covered with a film of aluminized TEFLON (polytetrafluoroethylene) this TEFLON film comprising an electret. The electret carries a substantial negative electric charge, on the order of −1200 volts.

A second of the at least two platforms inside the housing also is provided with two or three TLDs, but is covered instead by an uncharged film, such as aluminized MYLAR (polyester film).

Any additional platforms may be provided with TLDs for any other practical purpose consistent with the intended function and actual operation of the present invention.

BRIEF DESCRIPTION OF THE DRAWINGS

Other objects, features and advantages of the invention described in the above brief explanation will be more clearly understood when taken together with the detailed description below and the accompanying drawings, in which.

DETAILED DESCRIPTION OF THE PREFERRED EMBODIMENTS

Figure 1:
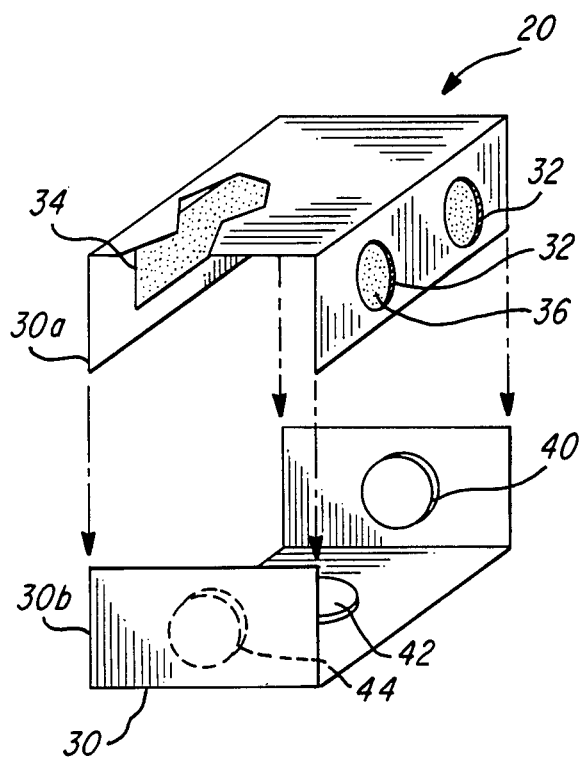
FIG. 1 is a partially exploded perspective view of a radon measuring device according to the invention.

Referring generally to FIG. 1, a simplified perspective view (partially exploded) of an embodiment of the invention is shown. The detector 20 is advantageously constructed from easily obtainable, commercially available components. According to a feature of the invention, the monitor device 20 employs passive diffusion thus requiring no special equipment to induce air flow such as pumps or power supplies. This special equipment was a principal drawback of many prior art radon detection devices, and is totally eliminated in the present apparatus. The monitor 20 is designed so as to require a minimum of special construction work such as shaping or milling, and assembly is quite easily completed.

A housing 30 has a top 30a and bottom 30b section, which can be assembled together to form or define an enclosed volume of space. The top and bottom sections 30a,30b are made of a material capable of shielding the inside of the housing from environmental beta-ray flux, and may be metal such as aluminum sheet having a thickness of approximately 0.1 centimeter. In a prototype of the invention, the housing 30 comprises a commercially available electrical "component box" of small size. The housing 30 may enclose a volume ranging from less than 200 cubic centimeters up to approximately 950 cubic centimeters, the preferred size due to ease of assembly.

The top cover 30a of the housing 30 is provided with at least one, and preferably two openings or holes approximately 2.54 centimeters in diameter in at least one, but again preferably each of the two sides of the top cover 30a. These holes 32 constitute diffusion ports for the passage of radioactive radon gas into the housing 30. The diffusion ports 32 may be covered by a coarse metallic grill 34, which may be made of aluminum wire, adapted to hold a foam filter material 36, such as urethane foam, over the diffusion ports 32.

At least two means for mounting radiation detectors, in this instance thermoluminescent dosimeters (TLDs), are mounted in the bottom section 30b of the housing 30. TLDs are known to be reliable radiation measurement devices. Incident radiation displaces valence electron in its atomic structure. These electrons are trapped in crystal defects intentionally introduced into the crystal lattice structure, and are released under application of sufficient heat energy. Electron release is accompanied by the emission of light in the 250–400 micron wavelength band. The number of photons emitted per unit time period (under predetermined readout conditions) is directly proportional to the radiation exposure, and the analyzing process is entirely electronic (i.e., no optical counting required).

In a preferred embodiment of the invention, three TLD mounts 40, 42, 44 are provided, as shown in FIG. 1. The TLDs mounted in each of the TLD mounting means 40, 42, 44 advantageously perform different monitoring functions, as described herein.

Figure 2:
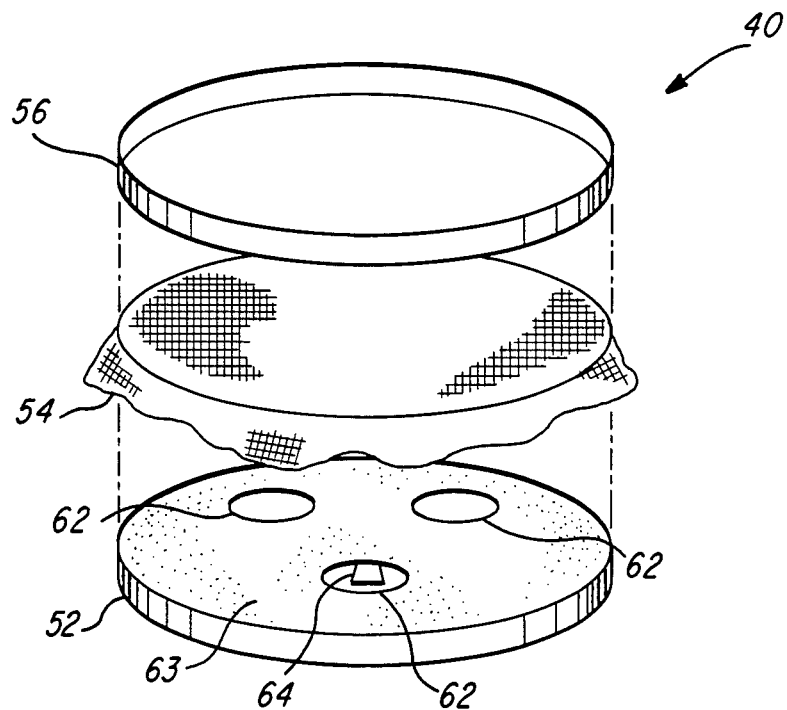
FIG. 2 is a perspective view, also partially exploded, of the platform disk/TLD/electret subassembly.

Referring now to FIG. 2, one of the TLD mounting means 40 is shown in partially exploded perspective view. The general arrangement of each of the other mounting means 42, 44 are similar, with the specific differences being made clear below. The structural elements of each of the detectors is substantially as shown in FIG. 2, with the principal difference being the material of sheet 54, as will be explained in greater detail.

As shown in FIG. 2, a ring 56 and disk 52 are provided for holding delicate objects, such as TLDs, securely. Both the ring 56 and disk 52 must be metallic, perferrably aluminum, and in this example have a diameter of approximately 2.54 cm. The ring 56 is adapted to fit snugly around the circumference of the disk 52. The top surface 63 of the disk 52 is provided with means for securely holding the radiation detectors. In this preferred embodiment, three beveled recesses 62 are formed, for example by milling, into the upper surface 63 of the disk 52. These beveled recesses 62 may have dimensions of, for example, 4.8 mm diameter and 0.4 mm depth.

According to the invention a radiation detector is provided in two of the three recesses 62 (only one TLD 64 shown). The third recess illustrated in FIG. 2 is not presently used, and may be omitted altogether. The TLD 64 is preferably a polished crystal of lithium fluoride (LiF). The crystal may also be lithium fluoride ($^7$LiF) in which the $^7$Li isotope predominates at a high atom fraction of 99.99%, or for certain short term measurement applications, calcium fluoride (CaF). Other useful thermoluminescent materials include calcium fluoride dysprosium (CaF$_2$:Dy), calcium fluoride manganese (CaF$_2$:Mn), another variety of lithium fluoride ($^6$LiF), calcium sulfate dysprosium (CaSO$_4$:Dy), and lithium borate manganese (Li$_2$B$_4$O$_7$:Mn). The TLD is approximately 0.04 cm thick, which is about half the usual commercial thickness, so as to limit its sensitivity to gamma-rays.

A first TLD mounting means 40 is further provided with a thin protective cover 54 to protect the radiation detectors 64 from visible light and dust. In this embodiment, the sheet material 54 comprises a thin layer of aluminized MYLAR having a weight of, for example, 0.9 milligrams per square centimeter, having a thickness of approximately 7.5 microns. The MYLAR cover 54 is stretched taut by the ring 56 which in turn holds the entire arrangement firmly to the disk 52.

The aluminized MYLAR film 54 is not electrically charged. As described, this arrangement may be used to detect the environmental gamma-ray exposure at the measurement site. Environmental gamma-rays from terrestrial sources induce a measureable signal in the TLDs 64, as do incoming cosmic rays. In order for the invention to be useful as a radon measurement device, the signal induced in the TLDs by the environmental gamma-rays and cosmic rays must be subtracted from the signal of the TLDs which actually measure the radioactive decay of radon gas.

A second mounting means 42 is fixed to another inner side of the bottom section 30b of the housing 30. This mounting means 42 also has the basic ring and disk configuration shown in FIG. 2. This assembly employs an electret in place of the aluminumized MYLAR film 54. In the preferred embodiment, the electret comprises a sheet of TEFLON F.E.P. (hexafluoropropylene co-polymer) aluminized on one side having thickness of approximately 25 microns. The electret is charged to a high negative potential, approximately 1200 negative Volts in the preferred embodiment, using known techniques, such as a room temperature, dry-contact method. In this method, a potential of approximately 3000 positive volts is applied to the aluminized side of a one and one-half inch diameter disk of TEFLON F.E.P. A negative electrode is placed upon the TEFLON side of the TEFLON F.E.P. and the potential is applied for about four minutes. After charging is completed, the electret is of course handled with TEFLON coated forceps to avoid accidental discharge.

The negative voltage charge of the electret may be measured with commercially available devices for measuring surface voltage, such as the model 230B "Stat-Arc" electrostatic field meter, manufactured by Monroe Electronics, Inc., of Lyndonville, N.Y., after recalibration so as to measure such a small object, or with known microprobe electrostatic voltmeters which are more appropriate for measuring small-sized electric fields.

A third disk/ring arrangement 44 may be mounted inside the housing 30 to determine any other pertinent data, such as any possible signal loss (fading) in the gamma-ray measuring TLDs. For example, a third TLD pair may be irradiated with a known exposure of gamma-rays prior to placement in the housing. After the measurement device 20 has been returned from the measurement site, the net signal per unit of exposure of the irradiated TLDs may be compared with that from other TLDs irradiated on or about the date that the signals of the returned irradiated pair are determined. A comparison of these two signal strengths per unit of gamma-ray exposure can be used to determine the degree of fading, if any.

Returning to the second described TLD pair of mounting means 42, the TLDs are utilized to detect the alpha and beta emissions of radon daughters RaA, RaB, RaC and RaC' as follows. The covered diffusion ports 32 permit passive diffusion of radon gas into the housing 30 while substantially preventing penetration of radon daughters into the measured volume. Once inside the housing 30, $^{222}$Rn decays to RaA. A substantial fraction of the RaA atoms are positively charged and are electrostatically attracted to the electret surface. There, RaA under goes further decay producing alpha and beta emitting radon daughters, such as RaB, RaC and RaC'. A fraction of the emitted energy is intercepted by the TLD pair underlying the electret, the negatively charged electret having served to attract and concentrate the positively charged daughters toward the TLDs. The RaA and RaC' alpha particles and the RaB and RaC beta particles are detected with different efficiencies.

In order for the invention to be of practical significance, the gamma-ray sensitivity of the TLDs must be known through accurate calibration. This calibration may be accomplished in any generally known manner, preferrably by irradiating the TLD pair with a known exposure to cobalt 60 $^{60}$Co) gamma-rays. The "THERATRON 780" Teletherapy Unit, manufactured by Atomic of Canada, may be used for such gamma-ray irradiation. The "THERATRON 780" is generally used in the radiation treatment of cancer patients.

As merely one example of the gamma-ray calibration procedure of a TLD pair, use of the "THERATRON 780" Teletherapy Unit will be described. This device has an extremely well known exposure output (plus or minus 4 percent). The TLD pair is placed in a plastic dish and covered by a plastic plate. The covering plate provides the necessary mass for electron build-up at the target to source distance (TSD) of about 80 cm.

After a known $^{60}$Co source exposure is delivered, the measured signal of the TLD pair is used to provide the ratio of TLD signal to total exposure, in units of nano-Coulombs per Roentgen (nC/R).

The environmental gamma-ray exposure rate is then provided by the formula:

$$\mathrm{uR/hour} = 10^6 \text{ (net nC)} / \text{(nC per R)(hours of exposure)},$$

where net nC in the formula above represents the gross measured signal, in nanoCoulombs, minus the background signal inherent in all TLDs (not due to ionizing radiation), and R is Roentgens.

In addition, the net TLD signal due to radon daughters electrostatically deposited on the electret must also be related to a radon gas ($^{222}$Rn) concentration in air. Also using known techniques, this calibration factor is determined by exposing the radon detector 20 to a known concentration of radon, in any known manner.

In experiments designed to test the accuracy of the present invention and its performance relative to other prior art radon detection systems, the present apparatus outperformed activated carbon monitors, PERMs and SSNTDs in measuring true radon concentration levels. At controlled high levels, measurements were within 8 percent of true value. At low environmental levels, measured concentrations were within 5 percent of true value. Activated carbon monitors were as much as 28 and 43 percent off, respectively, for high and low level measurements. PERMs gave readings more than 20 percent in error under high concentrations, and were inconsistent by wide margins under low environmental conditions. The SSNTDs were better, but still as much as 24 and 7 percent in error for the high and low conditions, respectively.

While one preferred embodiment of the invention has been described in detail, it will be understood that many variations and modifications are possible without departing from the spirit and scope of the invention.

We claim:

1. A device for measuring environmental radioactivity comprising:
   a housing having walls for enclosing a volume of air inside the housing, at least one wall having at least one opening therethrough for permitting radioactive gas to continuously diffuse into the volume of air; and
   a first radiation detection means mounted within the housing, for generating a first signal responsive to an amount of radioactivity produced over a period of time by the radioactive gas diffused in the volume of air, the first radiation detection means further comprising at least one thermoluminescence dosimeter mounted in close proximity to an electret,
   a second radiation detection means mounted within the housing, for generating a second signal responsive to an amount of environmental gamma radiation over the period of time, the second radiation detection means further comprising at least one thermoluminescence dosimeter, and
   a third radiation detection means mounted within the housing, for generating a third signal indicative of an amount of fading of said second signal over the period of time, the third radiation detection means further comprising at least one thermoluminescence dosimeter having an initially predetermined third signal,
   the device for measuring environmental radioactivity not having any means for actively moving the radioactive gas into the housing.

2. The device according to claim 1, wherein the housing is made of a material capable of substantially shielding the first radiation detection means from environmental beta-rays.

3. The device according to claim 2, wherein the housing material is aluminum.

4. The device according to claim 1, wherein the volume of air inside the housing is less than 1000 cubic centimeters.

5. The device according to claim 1, wherein at least the thermoluminescence dosimeter of the first radiation detection means is a crystal of a thermoluminescent material.

6. The device according to claim 5, wherein he thermoluminescent material is a variety of lithium fluoride ($^7$LiF), in which the $^7$Li isotope predominates at a high atom fraction of 99.99%.

7. The device according to claim 5, wherein the thermoluminescent material is lithium fluoride (LiF).

8. The device according to claim 5, wherein the thermoluminescent material is calcium fluoride (CaF).

9. The device according to claim 5, wherein at least the thermoluminescence dosimeter of the first radiation detection means has dimensions of approximately 32 cm $\times$ 0.32 cm $\times$ 0.04 cm.

10. The device according to claim 1, wherein the electret comprises a thin sheet of material selected from the group consisting of polyurethane, polyethylene and fluorocarbons.

11. The device according to claim 10, wherein the electret material is TEFLON F.E.P. (hexafluoropropylene copolymer), aluminized on one side.

12. The device according to claim 11, wherein the thin sheet of TEFLON F.E.P. (hexafluorpropylene copolymer) has a thickness of approximately 25 microns.

13. The device according to claim 1, further comprising a metal screen attached to the housing so as to cover the opening.

14. The device according to claim 1, further comprising a foam sheet material attached to the housing so as to cover the opening.

15. The device according to claim 14, wherein the foam sheet material is urethane foam.

* * * * *